United States Patent
Ikeda et al.

(10) Patent No.: US 9,895,958 B2
(45) Date of Patent: Feb. 20, 2018

(54) DEVICE AND METHOD FOR CONTROLLING VEHICLE

(71) Applicant: Nissan Motor Co., Ltd., Kanagawa (JP)

(72) Inventors: Naoyasu Ikeda, Kanagawa (JP); Ryosuke Ito, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 15/026,127

(22) PCT Filed: Sep. 30, 2013

(86) PCT No.: PCT/JP2013/076517
§ 371 (c)(1),
(2) Date: Mar. 30, 2016

(87) PCT Pub. No.: WO2015/045147
PCT Pub. Date: Apr. 2, 2015

(65) Prior Publication Data
US 2016/0236540 A1 Aug. 18, 2016

(51) Int. Cl.
*B60W 10/00* (2006.01)
*B60W 10/30* (2006.01)
(Continued)

(52) U.S. Cl.
CPC ....... *B60H 1/3208* (2013.01); *B60H 1/00385* (2013.01); *B60H 1/00764* (2013.01);
(Continued)

(58) Field of Classification Search
CPC .............. B60H 1/3208; B60H 1/00385; B60H 1/00392; B60H 2001/325;
(Continued)

(56) References Cited

U.S. PATENT DOCUMENTS 6,086,510 A * 7/2000 Kadota ................. F02D 11/105
477/107

FOREIGN PATENT DOCUMENTS

| JP | H08-142656 A | 6/1996 |
| JP | 2000-023309 A | 1/2000 |

(Continued)

OTHER PUBLICATIONS

International Preliminary Report on Patentability issued in corresponding International Application No. PCT/JP2013/076517, dated Jan. 5, 2015 (16 pages).

*Primary Examiner* — Jerrah Edwards
*Assistant Examiner* — Kelly D Williams
(74) *Attorney, Agent, or Firm* — Osha Liang LLP

(57) ABSTRACT

A control device for a vehicle has a compressor for an air-conditioning device that is driven by a vehicle drive source, and a condenser for the air-conditioning device that is disposed at a front side of the vehicle. A request torque to the vehicle drive source is determined as a sum of an air-conditioning load which is spent for driving the compressor and a running torque necessary to drive the vehicle by a drive wheel. The running torque is calculated based on an accelerator manipulation of a driver. A range-position signal indicating a selected range position is read. A value of the air-conditioning load when the air-conditioning device is in operation and the range position is in a Reverse-range is larger than a value of the air-conditioning load when the range position is in a Drive-range with respect to an identical refrigerant pressure of the air-conditioning device.

5 Claims, 3 Drawing Sheets

(51) Int. Cl.
*B60H 1/32* (2006.01)
*B60W 20/00* (2016.01)
*B60H 1/00* (2006.01)
*B60K 6/48* (2007.10)
*B60W 30/18* (2012.01)

(52) U.S. Cl.
CPC ............... *B60K 6/48* (2013.01); *B60W 10/00* (2013.01); *B60W 10/30* (2013.01); *B60W 20/00* (2013.01); *B60H 2001/3251* (2013.01); *B60H 2001/3266* (2013.01); *B60H 2001/3273* (2013.01); *B60K 2006/4825* (2013.01); *B60W 30/18036* (2013.01); *B60W 2510/0638* (2013.01); *B60W 2510/081* (2013.01); *B60W 2510/1005* (2013.01); *B60W 2510/305* (2013.01); *B60W 2520/10* (2013.01); *B60W 2540/10* (2013.01); *B60W 2710/0666* (2013.01); *B60W 2710/083* (2013.01); *Y02T 10/6221* (2013.01); *Y02T 10/6252* (2013.01)

(58) Field of Classification Search
CPC ... B60H 2001/3266; B60H 2001/3273; B60W 10/00; B60W 10/30; B60W 20/00
See application file for complete search history.

(56) References Cited

FOREIGN PATENT DOCUMENTS

| | | |
|---|---|---|
| JP | 2000-045814 A | 2/2000 |
| JP | 2000-272381 A | 10/2000 |
| JP | 2007-022297 A | 2/2007 |
| JP | 2010-018057 A | 1/2010 |
| JP | 2013-014155 A | 1/2013 |
| JP | 2013-121747 A | 6/2013 |
| JP | 2013-159330 A | 8/2013 |
| WO | 2011/138910 A1 | 11/2011 |

* cited by examiner

DEVICE AND METHOD FOR CONTROLLING VEHICLE

BACKGROUND

Technical Field

The present invention relates to a control for a vehicle in which a compressor for an air-conditioning device is driven by a vehicle drive source.

Related Art

A hybrid vehicle including an engine and a motor as the vehicle drive source is known. In a hybrid vehicle disclosed in Japanese Patent Application Publication No. 2013-159330, a motor/generator is located between an engine and drive wheels. Moreover, the engine is connected to the motor/generator through a clutch such that the engine can be disconnected from the motor/generator. Moreover, a manual clutch is interposed between the motor/generator and an input shaft of a transmission.

Japanese Patent Application Publication No. 2000-23309 discloses that torque of an engine and a motor/generator is controlled in consideration of load of a compressor for an air-conditioning device which is driven by the engine, in a hybrid vehicle.

A load which is spent for driving the compressor for the air-conditioning device is difficult to directly sense. Hence, generally, this load is estimated by use of a certain parameter of the air-conditioning device.

Japanese Patent Application Publication No. 2000-23309 does not disclose that a load necessary to drive the compressor is set to be different values from each other between at the time of forward running of the vehicle and at the time of reverse running of the vehicle.

SUMMARY

However, because a location and the like of a condenser in the air-conditioning device of the vehicle are set on the premise of a travelling wind at the time of forward running of the vehicle, the travelling wind does not substantially blow against the condenser at the time of reverse running. Accordingly, a drive load of the compressor at the time of reverse running is larger than that at the time of forward running, with respect to an identical thermal load. Therefore, if the load of the compressor for the air-conditioning device is estimated by use of a certain parameter of the air-conditioning device, actual torque applied to the drive wheels is reduced at the time of reverse running of the vehicle as compared with at the time of the forward running of the vehicle.

A control device for a vehicle according to one or more embodiments of the present invention comprises a compressor provided for an air-conditioning device and driven by a vehicle drive source; and a condenser provided for the air-conditioning device in a front side of the vehicle, wherein a request torque to the vehicle drive source is determined as a sum of an air-conditioning load which is spent for driving the compressor and a running torque necessary to drive the vehicle by a drive wheel, the running torque being calculated based on an accelerator manipulation of a driver, a range-position signal indicating a selected range position is read, and a value of the air-conditioning load when the air-conditioning device is in operation and the range position is in a Reverse-range is relatively large as compared with a value of the air-conditioning load when the range position is in a Drive-range with respect to an identical refrigerant pressure of the air-conditioning device.

Since the request torque is corrected in an increasing manner at the time of Reverse-range, the above-mentioned influence of air-conditioning load associated with the travelling wind depending on a running direction of the vehicle is cancelled out. Accordingly, a desired torque can be precisely obtained on the drive wheels even when the vehicle runs in the reverse direction.

DETAILED DESCRIPTION

Figure 1:
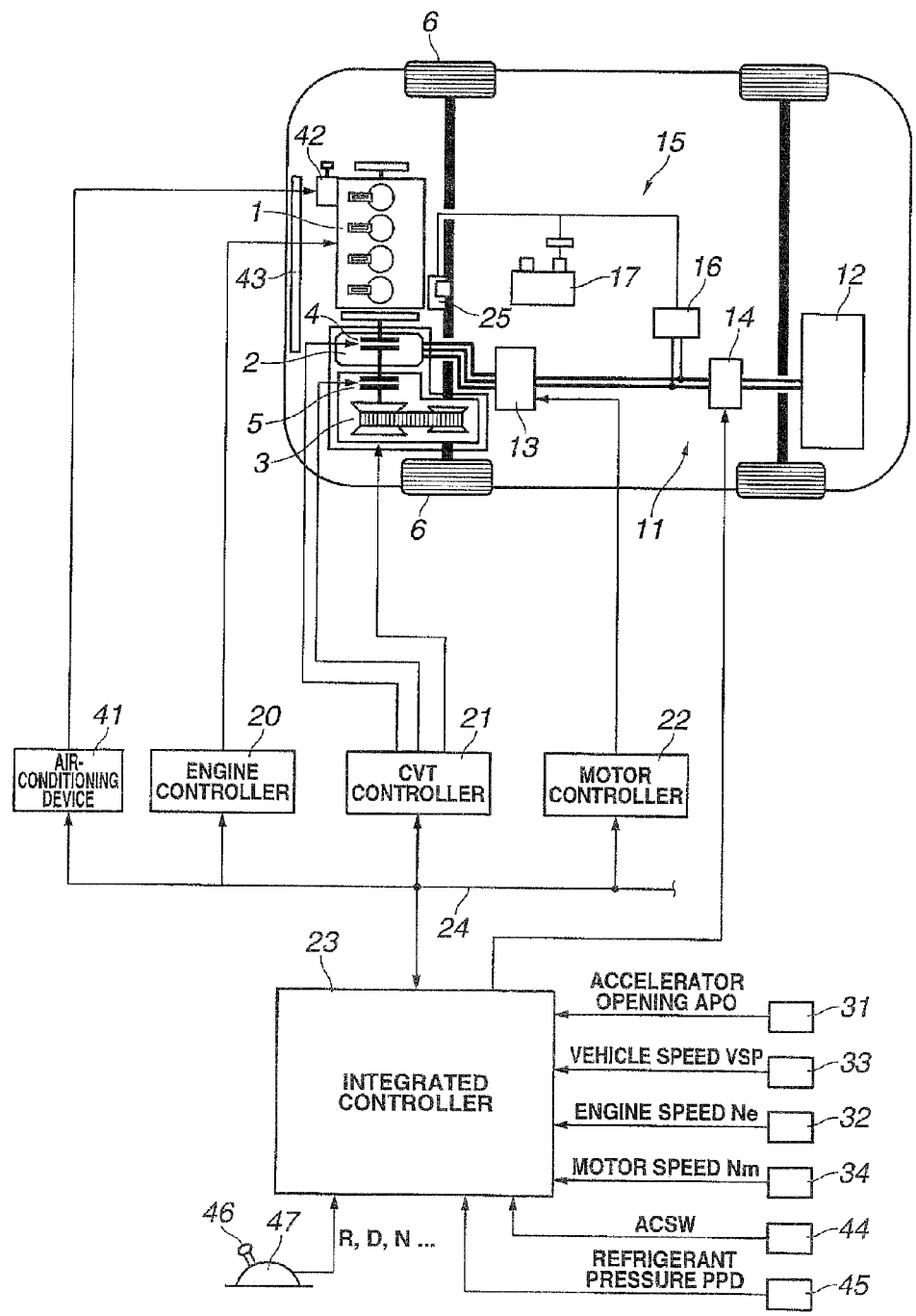
FIG. 1 is an explanatory view showing a system configuration of a hybrid vehicle to which the present invention is applied.

Hereinafter, embodiments of the present invention will be explained in detail referring to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

FIG. 1 is an explanatory view showing a system configuration of FF type (Front-engine Front-drive type) hybrid vehicle as one example of hybrid vehicle according to one or more embodiments of the present invention.

This hybrid vehicle includes an engine 1 and a motor/generator 2 as a drive source of the vehicle, and also includes a belt-type continuously variable transmission 3 as a shift mechanism. A first clutch 4 is interposed between the engine 1 and the motor/generator 2. A second clutch 5 is interposed between the motor/generator 2 and the belt-type continuously variable transmission 3.

The engine 1 is, for example, a gasoline engine. Start and stop controls of the engine 1 are performed based on control commands derived from an engine controller 20. An opening control of a throttle valve of the engine 1, a fuel-cut control of the engine 1 and the like are performed also based on the control commands derived from the engine controller 20.

The first clutch 4 provided between an output shaft of the engine 1 and a rotor of the motor/generator 2 is configured to connect (combine) the engine 1 with the motor/generator 2 or disconnect (release) the engine 1 from the motor/generator 2, according to a selected running mode. Engagement/disengagement of the first clutch 4 is controlled by a first-clutch oil pressure which is produced by a hydraulic unit (not shown) on the basis of control commands derived from a CVT controller 21. In one or more embodiments of the present invention, the first clutch 4 is a normally-open type clutch.

The motor/generator 2 is, for example, a three-phase AC (alternate-current) synchronous motor/generator. The motor/generator 2 is connected with a heavy-current circuit 11 which includes a high-voltage battery 12, an inverter 13 and a heavy-current relay 14. Based on control commands derived from a motor controller 22, the motor/generator 2 takes both of a motor action (so-called, power running) and a regenerative action. In the motor action, the motor/generator 2 outputs a positive torque by receiving power supply through the inverter 13 from the high-voltage battery 12. In the regenerative action, the motor/generator 2 generates electric power by means of torque absorption and thereby charges the high-voltage battery 12 through the inverter 13.

The second clutch 5 provided between the rotor of the motor/generator 2 and an input shaft of the continuously variable transmission 3 is configured to transmit power between drive wheels (front road-wheels) 6 and a vehicle drive source including the engine 1 and the motor/generator 2, and to disconnect the vehicle drive source from the drive wheels 6. Engagement/disengagement of the second clutch 5 is controlled by a second-clutch oil pressure which is produced by the hydraulic unit (not shown) on the basis of control commands derived from the CVT controller 21. In particular, the second clutch 5 can be made to become in a slipping engaged state in which power is transferred with accompanying slip, by controllably varying a transfer torque capacity of the second clutch 5. Hence, the second clutch 5 enables a smooth start of the vehicle and a creep running of the vehicle, without a torque converter.

In reality, the second clutch 5 is not a single friction element. That is, a forward clutch or a reverse brake of a forward/reverse switching mechanism provided in an input portion of the continuously variable transmission 3 is used as the second clutch 5. The forward/reverse switching mechanism functions to switch an input rotational direction to the continuously variable transmission 3 between a normal rotational direction for forward running and a backward rotational direction for reverse running. The forward/reverse switching mechanism includes a planetary gear mechanism, the forward clutch, and the reverse brake (not shown in details). The forward clutch is engaged at the time of forward running whereas the reverse brake is engaged at the time of reverse running. That is, the forward clutch functions as the second clutch 5 at the time of forward running whereas the reverse brake functions as the second clutch 5 at the time of reverse running. When both of the forward clutch and the revere brake which function as the second clutch 5 are in a released (disengaged) state, the torque is not transmitted, so that the continuously variable transmission 3 and the rotor of the motor/generator 2 are substantially disconnected from each other. It is noted that each of the forward clutch and the revere brake is a normally-open type clutch (brake) in one or more embodiments of the present invention.

The belt-type continuously variable transmission 3 includes an input-side primary pulley, an output-side secondary pulley, and a metallic belt wound between (around) the primary and secondary pulleys. A belt-contact radius of each of the primary and secondary pulleys, i.e. a transmission ratio (speed ratio) is continuously controlled by a primary oil pressure and a secondary oil pressure which are produced by the hydraulic unit (not shown) on the basis of control commands derived from the CVT controller 21. An output shaft of the continuously variable transmission 3 is connected through a final reduction gear mechanism (not shown) to the drive wheels 6.

The engine 1 includes a starter motor 25 for its start. The starter motor 25 is a direct-current motor which has a low rated voltage as compared with the motor/generator 2. The starter motor 25 is connected to a weak-current circuit 15 which includes a low-voltage battery 17 and a DC-DC converter 16. The starter motor 25 is driven based on control commands derived from the engine controller 20, and thereby conducts a cranking of the engine 1.

Moreover, the vehicle is equipped with an air-conditioning device 41 which includes a compressor 42, a condenser 43, a blower fan (not shown) and the like. The compressor 42 of the air-conditioning device 41 is mechanically driven by an output of the engine 1 through an electromagnetic clutch (not shown).

The low-voltage battery 17 is charged through the DC-DC converter 16 by electric power derived from the heavy-current circuit 11 which includes the high-voltage battery 12. It is noted that the weak-current circuit 15 supplies electric power to the air-conditioning device 41, an audio device, a light fixture and the like of the vehicle, and a vehicle control system including the engine controller 20 and the like.

The control system of the hybrid vehicle includes an integrated controller 23 in addition to the above-mentioned engine controller 20, the CVT controller 21 and the motor controller 22. The integrated controller 23 performs an integration control for whole the vehicle. These controllers 20, 21, 22 and 23 are connected to one another through a CAN communication line 24 through which mutual information exchange is possible. Moreover, the control system of the hybrid vehicle includes various sensors and the like such as an accelerator opening sensor 31, an engine rotational-speed sensor 32, a vehicle speed sensor 33 and a motor rotational-speed sensor 34. The respective controllers such as the integrated controller 23 receive detection signals of these sensors individually or through the CAN communication line 24 as needed.

Furthermore, the integrated controller 23 receives a signal ACSW derived from an air-conditioning switch 44 which requires an operation (actuation) of the air-conditioning device 41. Moreover, a refrigerant pressure sensor 45 is provided for sensing a refrigerant pressure PPD in the condenser 43 as a parameter indicating an operating state of the air-conditioning device 41. A detection signal of the refrigerant pressure sensor 45 is received by the integrated controller 23.

The belt-type continuously variable transmission 3 includes a select lever 46 which is manipulated by a driver. A range position signal which indicates a range position (shift position) selected by the select lever 46 is inputted from a select switch 47 into the integrated controller 23 and the CVT controller 21. The range position is, for example, an R-range (Reverse range) which is selected at the time of reverse running, a D-range (Drive range) which is selected at the time of normal forward running, a N-range (Neutral range), or an L-range (Low range) in which a forward running with a restricted transmission ratio is conducted. The CVT controller 21 performs the above-mentioned switching of the forward/reverse switching mechanism and sets a target transmission ratio, according to the selected range position.

The hybrid vehicle constructed as mentioned above has running modes such as an electric-vehicle running mode (hereinafter called "EV mode"), a hybrid running mode (hereinafter called "HEV mode") and a drive-torque-control start mode (hereinafter called "WSC mode"). A suitable running mode is selected from these "EV mode", "HEV mode" and "WSC mode" in accordance with a driving state of the vehicle and an accelerator manipulation of a driver or the like.

In the "EV mode", the vehicle runs by using only the motor/generator 2 as the drive source with the first clutch 4 released. This "EV mode" includes a motor running mode and a regenerative running mode. The "EV mode" is selected when a request driving force of a driver is relatively low.

In the "HEV mode", the vehicle runs by using the engine 1 and the motor/generator 2 as the drive source with the first clutch 4 engaged. This "HEV mode" includes a motor-assist running mode, a running power-generation mode and an engine running mode. The "HEV mode" is selected when the request driving force of a driver is relatively large or when the system requires the "HEV mode" on the basis of a state of charge (SOC) of the high-voltage battery 12 and the driving state of the vehicle or the like. In the case that the signal ACSW derived from the air-conditioning switch 44 indicates "ON", the "HEV mode" is selected in order to drive the compressor 42.

The "WSC mode" is selected when a vehicle speed is relatively low, e.g. when the vehicle starts to move. In the "WSC mode", the second clutch 5 is made to be in the slipping engaged state, by variably controlling the transfer torque capacity of the second clutch 5 while controlling a rotational speed of the motor/generator 2.

Figure 2:
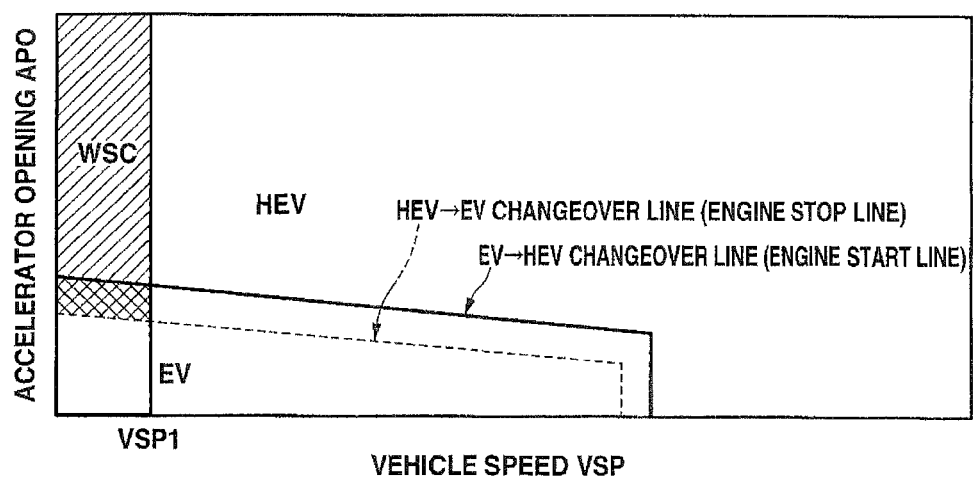
FIG. 2 is a characteristic view showing a characteristic of mode changeover of the hybrid vehicle.

FIG. 2 shows a basic changeover characteristic among the above-mentioned "EV mode", "HEV mode" and "WSC mode" with reference to the vehicle speed VSP and the accelerator opening APO. As shown in FIG. 2, a "HEV→EV changeover line" through which the "HEV mode" is changed into the "EV mode" and an "EV→HEV changeover line" through which the "EV mode" is changed into the "HEV mode" are set to have a proper hysteresis (level difference) from each other. Moreover, the "WSC mode" is used in a region lower than or equal to a predetermined vehicle speed VSP1.

When the air-conditioning device 41 is in operation because of "ON" signal of the air-conditioning switch 44, the "HEV mode" is used as mentioned above. Hence, the vehicle runs by using the engine 1 and the motor/generator 2 as the drive source while the compressor 42 is driven by the engine 1. A request torque to the drive source constituted by the engine 1 and the motor/generator 2 is basically calculated by adding an air-conditioning load which is spent in driving the compressor 42 of the air-conditioning device 41 and a power-generating load which is spent in generating electric power in the motor/generator 2, to a running torque necessary to drive the vehicle by the drive wheels 6. The integrated controller 23 determines the request torque to whole the drive source constituted by the engine 1 and the motor/generator 2, and then determines shares therebetween, i.e. an individual request torque value to each of the engine 1 and the motor/generator 2. Thereby, the integrated controller 23 outputs control commands to the engine controller 20 and the motor controller 22. The above-mentioned running torque is, for example, calculated based on the accelerator manipulation of a driver. The air-conditioning load is estimated based on the refrigerant pressure PPD in the condenser 43 which is detected by the refrigerant pressure sensor 45 as the parameter indicating the operating state of the air-conditioning device 41. The power-generating load is calculated based on a target power-generation amount which is determined from the state of charge (SOC) of the high-voltage battery 12 and an electric power consumption of various electrical equipment or the like.

In one or more embodiments of the present invention, the air-conditioning load is set at values different from each other between at the time of vehicle forward running and at the time of vehicle reverse running. That is, the condenser 43 of the air-conditioning device 41 is influenced by a traveling wind when the vehicle runs in the forward direction, whereas the condenser 43 is not influenced by the traveling wind when the vehicle runs in the reverse direction. In consideration of this, the air-conditioning load is set at a larger value at the time of reverse running with respect to an identical level of the refrigerant pressure PPD.

Figure 3:
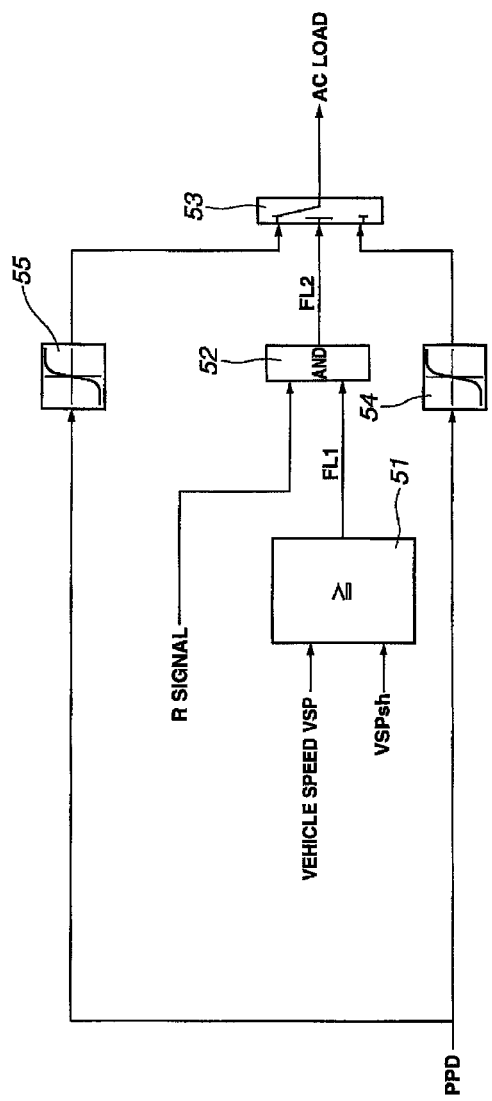
FIG. 3 is a functional block diagram of a relevant part that estimates an air-conditioning load.

FIG. 3 is a functional block diagram of estimation processing of the air-conditioning load. A comparing section 51 receives the vehicle speed signal VSP and a predetermined vehicle-speed threshold value VSPsh. If the vehicle speed VSP is higher than or equal to the threshold value VSPsh, the comparing section 51 outputs "1" to an AND-circuit section 52 as a flag FL1 which is received by the AND-circuit section 52. The threshold value VSPsh corresponds to a minimum necessary speed to regard the vehicle as being practically running. In other words, the threshold value VSPsh corresponds to a minimum necessary speed for the traveling wind to influence the air-conditioning device 41. For example, the threshold value VSPsh is approximately equal to 5 km/h.

The AND-circuit section 52 receives a reverse signal in addition to the flag FL1. The reverse signal is outputted from the select switch 47 at the time of reverse running (i.e. when the R-range position is selected). If the flag FL1 is in the status of "1" and the reverse signal indicates "ON" (i.e. the status of "1"), the AND-circuit section 52 outputs "1" to a switching section 53 as a flag FL2 which is received by the switching section 53.

The switching section 53 switches between a forward-running map 54 and a reverse-running map 55 as an air-conditioning load estimating map. If the flag FL2 is in the status of "0", the switching section 53 selects the forward-running map 54. If the flag FL2 is in the status of "1", the switching section 53 selects the reverse-running map 55.

A characteristic of the air-conditioning load with reference to the refrigerant pressure PPD in the condenser 43 is given to each of the forward-running map 54 and the reverse-running map 55. Each of the forward-running map 54 and the reverse-running map 55 outputs a value of the air-conditioning load in response to a value of the refrigerant pressure PPD sensed by the refrigerant pressure sensor 45. The reverse-running map 55 has a value of the air-conditioning load which is larger than that of the forward-running map 54, with reference to an identical value of the refrigerant pressure PPD. This is because the influence of the traveling wind is taken into consideration. A value of the air-conditioning load which is outputted by each of the forward-running map 54 and the reverse-running map 55 is limited by a predetermined limit value, in order not to excessively enlarge the air-conditioning load in a case that an abnormal value of the refrigerant pressure PPD is outputted due to a failure of the refrigerant pressure sensor 45 or the like.

Accordingly, as a final air-conditioning load (AC load), a relatively small value based on the forward-running map 54 is outputted when the vehicle runs in the forward direction (at the time of forward running) whereas a relatively large value based on the reverse-running map 55 is outputted when the vehicle runs in the reverse direction (at the time of reverse running).

In consideration of the air-conditioning load estimated as mentioned above, the integrated controller 23 calculates the request torque which is required to the drive source including the engine 1 and the motor/generator 2. Hence, if the power-generating load and the running torque required by a driver have identical levels between at the time of forward running and at the time of reverse running, the request torque to the drive source at the time of reverse running is larger than that at the time of forward running. Therefore, an actual difference in compressor drive torque which is caused by presence/absence of the traveling wind blown to the condenser 43 in association with the running direction is cancelled out (offset). As a result, the running torque by the drive wheels 6 can be equally obtained between at the time of forward running and at the time of reverse running.

In the one or more embodiments of the present invention, the vehicle speed VSP is checked as an additional condition. That is, when the vehicle speed VSP is lower than the threshold value VSPsh below which the vehicle can be regarded as being in a substantially stopped state, the forward-running map 54 is used as it is even in the R-range. Namely, when the vehicle is in the stopped state or in a very low vehicle-speed region, the forward-running map 54 is used regardless of the position of the select lever 46 because the influence of the traveling wind associated with the running direction does not exist substantially. By so doing, an unnecessary increase of the request torque is avoided.

In one or more of the above embodiments, the correction of the air-conditioning load for the reverse running is realized by switching between the maps 54 and 55. However, according to one or more embodiments of the present invention, for example, a value of the air-conditioning load calculated by a certain map or arithmetic formula based on the refrigerant pressure PPD may be corrected to be increased at the time of reverse running.

Alternatively, an identical value of the air-conditioning load may be used at the time of forward running and also at the time of reverse running. In this case, a value of request torque (which is required to the drive source) determined based on this value of the air-conditioning load is somewhat corrected in an increasing manner only at the time of reverse running, so that the difference in compressor drive torque associated with the running direction is cancelled out.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A control device for a vehicle, comprising:
   a compressor for an air-conditioning device that is driven by a vehicle drive source;
   a condenser for the air-conditioning device that is disposed at a front side of the vehicle; and
   a controller configured to:
      determine a request torque to the vehicle drive source as a sum of an air-conditioning load which is spent for driving the compressor and a running torque necessary to drive the vehicle by a drive wheel,
      calculate the running torque based on an accelerator manipulation of a driver,
      read a range-position signal indicating a selected range position, and
      calculate the air-conditioning load in a manner that a value of the air-conditioning load when the air-conditioning device is in operation and the range position is in a Reverse-range is larger than a value of the air-conditioning load when the range position is in a Drive-range with respect to an identical refrigerant pressure of the air-conditioning device.

2. The control device according to claim 1,
   wherein the controller is further configured to calculate the air-conditioning load from a map into which a refrigerant pressure in the condenser of the air-conditioning device is inputted, and
   wherein the map has different characteristics from each other between a time of the Drive-range and a time of the Reverse-range.

3. The control device according to claim 1,
   wherein the controller is further configured to correct the request torque to be increased under an additional condition where a vehicle speed is higher than or equal to a predetermined speed.

4. The control device according to claim 2,
   wherein the controller is further configured to correct the request torque to be increased under an additional condition where a vehicle speed is higher than or equal to a predetermined speed.

5. A control method for a vehicle, the vehicle comprising a compressor for an air-conditioning device that is driven by a vehicle drive source, and a condenser for the air-conditioning device that is disposed at a front side of the vehicle, comprising:
   operating the air-conditioning device;
   determining a request torque to the vehicle drive source as a sum of an air-conditioning load which is spent for driving the compressor and a running torque necessary to drive the vehicle by a drive wheel, the running torque being calculated based on an accelerator manipulation of a driver;
   reading a selected range position; and
   causing a value of the air-conditioning load when the air-conditioning device is in operation and the range position is in a Reverse-range to be larger than a value of the air-conditioning load when the range position is in a Drive-range with respect to an identical refrigerant pressure of the air-conditioning device.

* * * * *